(12) United States Patent
Murphy et al.

(10) Patent No.: US 12,353,763 B2
(45) Date of Patent: Jul. 8, 2025

(54) HYBRID COMMODITY COMPUTATIONAL STORAGE DEVICES

(71) Applicant: Gem State Informatics, Inc., Boise, ID (US)

(72) Inventors: Richard Murphy, Boise, ID (US); Allan Porterfield, Durham, NC (US)

(73) Assignee: Gem State Informatics, Inc., Boise, ID (US)

( * ) Notice: Subject to any disclaimer, the term of this patent is extended or adjusted under 35 U.S.C. 154(b) by 458 days.

(21) Appl. No.: 18/045,298

(22) Filed: Oct. 10, 2022

(65) Prior Publication Data

US 2024/0118830 A1    Apr. 11, 2024

(51) Int. Cl.
*G06F 3/06* (2006.01)

(52) U.S. Cl.
CPC .......... *G06F 3/0659* (2013.01); *G06F 3/0604* (2013.01); *G06F 3/0635* (2013.01); *G06F 3/067* (2013.01)

(58) Field of Classification Search
None
See application file for complete search history.

(56) References Cited

U.S. PATENT DOCUMENTS

2005/0283487 A1* 12/2005 Karlsson ............... G06F 3/0617
2017/0185490 A1*  6/2017 Sridharan ........... G06F 11/1464

* cited by examiner

*Primary Examiner* — Craig C Dorais
(74) *Attorney, Agent, or Firm* — HSML P.C.

(57) ABSTRACT

A computational storage system includes a computational storage subsystem having a controller and a storage. The controller is configured to receive a work chunk from a host. The work chunk includes identification of an executable object and identification of a data object. The controller is further configured to locate the data object in the storage via the identification of the data object, obtain a copy of the data object in a memory of the controller, execute functions in the executable object on the data object in the memory of the controller to generate a result object, and convey the result object to a destination of the computational storage system.

20 Claims, 8 Drawing Sheets

HYBRID COMMODITY COMPUTATIONAL STORAGE DEVICES

STATEMENT REGARDING FEDERALLY SPONSORED RESEARCH OR DEVELOPMENT

This invention was made with government support under DE-SC0021518 awarded by the U.S. Department of Energy. The government has certain rights in the invention.

FIELD

This disclosure relates generally to systems and methods directed to computational storage devices. More specifically, the disclosure relates to a computational storage system having a storage subsystem with integrated computational acceleration, a memory subsystem, and a host; and relates to methods controlling the storage subsystem, the memory subsystem, and/or the host to conduct object focused computation locally at different levels of the computational storage system.

BACKGROUND

Computational storage device is a device that provides computing services in the storage system and supports persistent data storage including NAND Flash or other non-volatile memory. At the computational storage device level, existing methods typically treat the storage device as a block device to read the data in unit of block, which is cumbersome to do data transformation. Field-programmable gate array (FPGA) or other input/output (IO) processors (e.g., an arm processor) can be used to perform specific operations such as indexing data as it enters the storage device, searching the contents for specific patterns, encryption, video encoding, running operating system (OS) instances or the like. FPGAs are typically more expensive and consume more energy than other processors. Typical IO processors for computational storage device are either expensive, limited in capability, or are limited to running highly specialized operations.

SUMMARY

This disclosure relates generally to systems and methods directed to computational storage devices. More specifically, the disclosure relates to a computational storage system having a storage subsystem with integrated computational acceleration, a memory subsystem, and a host; and relates to methods controlling the storage subsystem, the memory subsystem, and/or the host to conduct object focused computation locally at different levels of the computational storage system.

Everyday a huge amount of data may be generated and stored. The data can be big, growing, and distributed. Moving data can be expensive and/or difficult because of concerns of time (including latency, bandwidth, or the like), energy required to move the data, and regulations on data movement from one subsystem to another.

Data is typically stored in a storage system. Traditional high-cost FPGA-based computational storage systems may treat the storage system as a "block device" to maintain compatibility with standard storage devices. This may create a much more complex and/or highly customized programming environment. FPGA-based computational storage systems may have struggled to find the "right" hardware accelerator to demonstrate the utility of the solution e.g., for the cost; however, those solutions tend not to be generalized.

Embodiments disclosed herein can provide a computational storage subsystem and a memory subsystem that provide computational offload, enabling a distributed acceleration system that allows for data objects to be read and/or to be reduced in size. It will be appreciated that accessing objects can simplify how the controller deals with the storage and can reduce the overhead compared with computational storage device industry's traditional practice of accessing blocks. Embodiments disclosed herein can enable the data being passed from the storage subsystem and/or from the memory subsystem to the host to be the data the host needs, rather than requiring movement of all the data to the host to be processed, and thus reducing the data movement in the computational storage system.

As the data movement itself is energy intensive, embodiments disclosed herein can also address the data movement bottleneck facilitating lower power and additional computational capability throughout the storage subsystem and memory subsystem hierarchy. Embodiments disclosed herein can also create a system that is more capable, particularly for exploratory data science and artificial intelligence workloads. Embodiments disclosed herein can further enable the solution to problems that may be impractical to solve by other mechanisms, e.g., where the data movement time from the storage subsystem to the host may make the solution impractical. Embodiments disclosed herein can provide an inexpensive, simple, and programmable solution.

Embodiments disclosed herein can further leverage commodity microcontrollers (MCUs) with algorithm(s) to manage the storage and to reduce the cost of implementing computational storage devices. It will be appreciated that existing solutions typically use high-cost FPGAs that are complex to program, require application-specific integrated circuits (ASICs) integrated with the storage controller that manages the NAND storage, or are specialized for specific types of offloaded computation. Compared with the existing solutions, embodiments disclosed herein can allow for the use of higher performance compute units used in other high-volume markets at lower cost.

Embodiments disclosed herein can also enable management of "metadata" associated with objects, including access control and security. For example, objects may be unavailable (or only partially available) to various users depending on personal access rights. Also, different users may see different objects or see the same object differently, and get different results from operating the objects. Embodiments disclosed herein can provide additional functionality for object management and understanding its data movement requirements and how the object is to be interpreted (e.g., data format or the like) and managed (e.g., policy or the like).

In an embodiment, a computational storage system is provided. The computational storage system includes a storage subsystem having a controller and a storage. The controller is configured to receive a work chunk from a host. The work chunk includes identification of an executable object and identification of a data object. The controller is further configured to locate the data object in the storage via the identification of the data object, obtain a copy of the data object in a memory of the controller, execute functions in the executable object on the data object in the memory of the controller to generate a result object, and convey the result object to a destination of the computational storage system.

In an embodiment, a method for a computational storage system is provided. The computational storage system includes a storage subsystem having a controller and a storage. The method includes the controller receiving a work chunk from a host. The work chunk includes identification of an executable object and identification of a data object. The method further incudes the controller locating the data object in the storage via the identification of the data object, the controller obtaining a copy of the data object in a memory of the controller, the controller executing functions in the executable object on the data object in the memory of the controller to generate a result object, and the controller conveying the result object to a destination of the computational storage system.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

Figure 1:
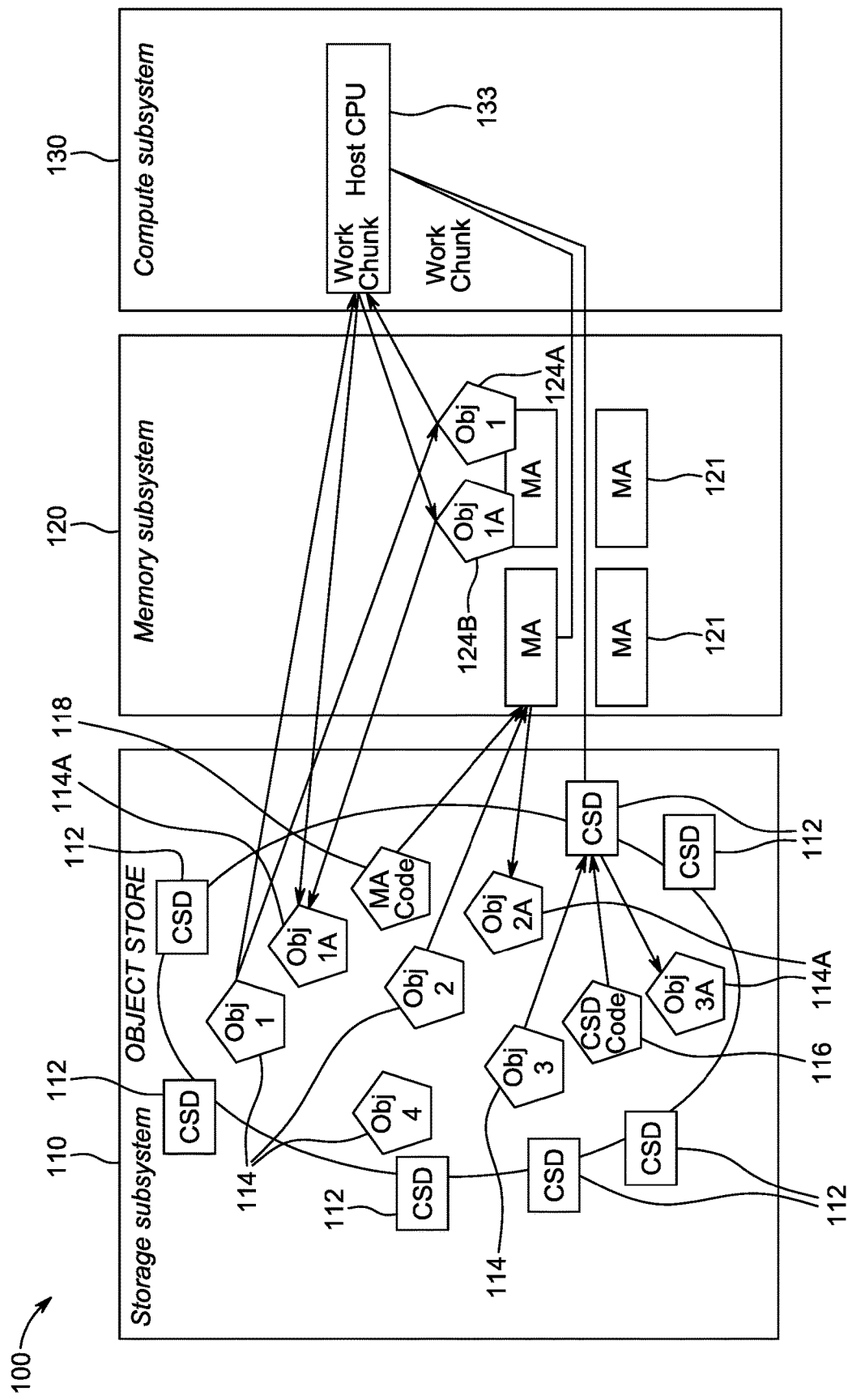
FIG. 1 is a block diagram illustrating work chunk execution at different levels of a computational storage system, according to an embodiment.

This disclosure relates generally to systems and methods directed to computational storage devices. More specifically, the disclosure relates to a computational storage system having a storage subsystem with integrated computational acceleration, a memory subsystem, and a host; and relates to methods controlling the storage subsystem, the memory subsystem, and/or the host to conduct object focused computation locally at different levels of the computational storage system. It will be appreciated that the computational storage system can have its own computing capacity and memory within the storage.

Embodiments disclosed herein can provide a general purpose accelerator solution to the computational storage subsystem and/or to the memory subsystem, which can be easier to program and cheaper than traditional computational storage subsystems.

Embodiments disclosed herein can also enable an object store on the computational storage device, better manage the interaction with the host with industry standard mechanisms, create opportunities for extending the overall programming environment beyond storage to the memory hierarchy and offloading the majority of the object store workload from a storage server or host processor at lower cost, and/or enable the cheaper hardware by innovated software/algorithm to provide a better cost for solving the overall problem.

As defined herein, the phrase "memory" may refer to a device or system that is used to store information for immediate use in a computer or related computer hardware and digital electronic devices. It will be appreciated that the phrase "memory" may also refer to "volatile memory", which is computer memory that requires power to maintain the stored information. Volatile memory includes static random-access memory (SRAM), dynamic random-access memory (DRAM), or the like. SRAM is used for central processing unit (CPU) cache or in small embedded systems requiring little memory. DRAM is used for main memory (also known as internal memory, prime memory, or the like), often referred to simply as memory, which is directly accessible to the CPU. It will be appreciated that in most cases, the memory for the memory subsystem can be volatile memory but in some embodiments, the memory for the memory subsystem can be non-volatile memory.

As defined herein, the phrase "storage" may refer to a mechanism that enables a computer to retain data. It will be appreciated that the phrase "storage" may also refer to non-volatile memory that can retain the stored information even when not powered. Storage devices such as flash drives, hard disks, or the like are a fundamental component of most digital devices since they allow users to preserve all kinds of information such as videos, documents, pictures, and raw data. Data storage may refer to magnetic, optical, mechanical, or other types of media that records and preserves digital information for ongoing or future operations.

As defined herein, the phrase "host" may refer to processor(s). In an embodiment, a host can be a CPU, which is the electronic circuitry that executes instructions comprising a computer program. It will be appreciated that the host can perform out-of-order execution (i.e. dynamic execution) to make use of instruction cycles that would otherwise be wasted. The host can include volatile memory such as CPU cache or the like. In an embodiment, the host can include graphics processing unit(s) (GPUs). It will be appreciated that dynamic execution typically cannot cover the latency of local memory access or storage access. Embodiments disclosed herein can give the host only the data that it needs to increases the host's efficiency.

As defined herein, the phrase "computational storage device" may refer to a device that provides computing services in the storage system and supports persistent data storage including NAND flash or any suitable non-volatile memory. It will be appreciated that computational storage may refer to architectures that provide computational storage functions (CSF) coupled to storage, offloading host processing or reducing data movement.

As defined herein, the phrase "solid-state device" or "SSD" may refer to a storage device that uses integrated circuit assemblies to store data persistently, typically using flash memory, and functioning as secondary storage in the hierarchy of computer storage. It will be appreciated that most nonvolatile memory used in SSDs is the NAND variety. It will also be appreciated that NAND Flash memory, which is named for the NAND logic gates, refers to a type of non-volatile storage technology that does not require power to retain data. The implementation architecture of typical nonvolatile media and/or the requirements for error correction of that media (which tends to be more error prone than volatile memories) mean that data on the media is typically accessed in a fixed size block.

It will be appreciated data can be recorded and stored in different forms such as file storage, block storage, object storage, or the like.

As defined herein, the phrase "file storage" may refer to a hierarchical storage methodology used to organize and store data on a storage device such as a computer hard drive or a network-attached storage device. In file storage, data can be stored in files, the files can be organized in folders, and the folders can be organized under a hierarchy of directories and subdirectories. It will be appreciated that in some embodiments, parallel file systems (clustered file systems to store data across multiple networked servers and to facilitate high-performance access through simultaneous, coordinated input/output operations between clients and storage nodes), such as high Performance File System (HPFS), can be built on top of object stores.

As defined herein, the phrase "block storage" may refer to a technology used to store data into blocks. Block storage breaks up data into blocks and then stores those blocks as separate pieces, each with a unique identifier. A block may refer to a physical record, which can be a sequence of bytes or bits, usually containing some whole number of records, having a maximum length: a block size (e.g., 4 KB or the like).

As defined herein, the phrase "object storage" or "object store" may refer to an object-based storage, which is a data storage architecture for handling large amounts of typically unstructured data (e.g., data that does not conform to, or cannot be organized easily into, a traditional relational database with rows and columns). It will be appreciated that Internet communications data is largely unstructured. Object storage offers a level of scalability not possible with traditional file- or block-based storage. With object-based storage, users can store and manage data volumes on the order of terabytes (TBs), petabytes (PBs), and even greater. Object storage breaks data files up into pieces called objects. Objects are discrete units of data that are stored in a structurally flat data environment. There are no folders, directories, or complex hierarchies as in a file-based system. Each object is a simple, self-contained repository that includes the data, metadata (descriptive information associated with an object), and a unique identifying ID number (instead of a file name and file path). This information enables an application to locate and access the object. Objects (data and/or code) in an object-storage system are typically accessed via Application Programming Interfaces (APIs). In practice, applications manage all of the objects, eliminating the need for a traditional file system. Each object receives a unique ID, which applications use to identify the object. It will be appreciated that in some embodiments, metadata can be used to construct some structure similar to a filesystem and can be "mounted" as one (e.g., through fuse on Linux, or another interface built on top, or the like).

As defined herein, the phrase "work chunk" may refer to a piece of work (including a set of instructions and a set of data) to do in an object. It will be appreciated that work chunk(s) can be executed at any appropriate computational storage device with object store visibility. The computational storage device can use objects to containerize the work and data. A work chunk can define the work to be done (e.g., device-specific function to execute, or the like) and/or define the data to be processed (e.g., object(s) in the global object store, or the like). Work chunk(s) are movable or transferable. Applications and workflows can be represented as a series of work chunks executed on data in the object store. In an embodiment, a work chunk can be a piece of the work the host may otherwise do but handled over to the memory subsystem or the computational storage subsystem or both subsystems to be done. In an embodiment, a work chunk can be message (e.g., from the host) to remote compute device (e.g., the memory subsystem and the storage subsystem described herein) that defines both data to use and the work to be done. The work chunk (e.g., its format or the like) can be built on existing object store packages. The work chunk can be movable if the receiving device understands the work (i.e., can execute the defined function or identify an equivalent function it can execute) and has access to the requested object(s). Applications can decide the "best" location (e.g., in the storage subsystem, in the memory subsystem, and/or in the host, etc.) for each work chunk (e.g., depending on data locality, memory bandwidth, computational performance, time to execute, energy to execute, or the like). Work chunks can be executed in parallel, serially, and/or pipelined.

As defined herein, the phrase "compute express link" or "CXL" may refer to a standard for high-speed central processing unit (CPU)-to-device and/or CPU-to-memory connections, designed for high performance data center computers. CXL includes cache-coherent protocols for accessing system memory (e.g., host memory or host cache or the like) and device memory (e.g., memory in the memory subsystem or the like). In an embodiment, the host and the memory subsystem can be CXL enabled. It will be appreciated that in some embodiments, any suitable cache coherency protocols (e.g., OpenCAPI (Open Coherent Accelerator Processor Interface), QPI (QuickPath Interconnect), or the like) can be used.

FIG. 1 is a block diagram illustrating work chunk execution at different levels of a computational storage system 100, according to an embodiment. The computational storage system 100 includes a storage subsystem 110, a memory subsystem 120, and a computing subsystem 130. The computing subsystem 130 includes a host 133. The memory subsystem 120 can include volatile memory (e.g., DRAM or the like, not shown) and memory accelerator(s) 121 (or memory controllers or the like, which can generate memory accelerator engine or thread(s)). It will be appreciated that the data transfer bandwidth between the computing subsystem 130 (i.e., the host 133 in a simplified version) and the storage subsystem 110 may be much less than the data transfer bandwidth between the computing subsystem 130 (the host 133) and the memory subsystem 120.

In an embodiment, the storage subsystem 110 is a computational storage subsystem having a controller (not shown) and a storage (not shown). The controller can be a low-cost, low-power, high performance commodity microcontroller such as an Internet of things (IoT) microcontroller or any suitable microcontroller. Those microcontrollers are not typically used in the computational storage device industry. The storage can be NAND flash memory, SSD, or any suitable non-volatile memory. The storage can be configured as object storage or object store.

In an embodiment, data can be stored in the object store as data object(s) (114, 114A). For example, data object(s) 114 can be the data to be processed, and data object(s) 114A can be the resultant data from processing the data object(s)

114. Functions and/or instructions can be stored in the object store as executable object(s) (116, 118). For example, executable object(s) 116 can be the function(s) or code to be executed by the microcontroller or the computational storage drive (CSD) 112 generated by the microcontroller, and executable object(s) 118 can be the function(s) or code to be executed by the memory subsystem (e.g., memory accelerator(s) 121 or their corresponding memory accelerator engine/thread). It will be appreciated that in an embodiment, the code can be embedded in the object(s). In other embodiments, the code can be independent to the object(s) and can be loaded onto the system.

In an embodiment, the CSD 112 can include a thread (e.g., a polling thread, a CSD engine, or the like) waiting for work chunks from e.g., the host 133. For example, thread(s) inside the CSD engine (e.g., a polling thread waiting for work to show up) can wait for message(s) appearing across the bus from the host to give the thread a work chunk (which includes at least two object pointers). The thread can load one object pointer (data) into its address space to issue instructions against it, and load another pointer into the address space and treat it as a standard function (i.e., the code to execute). It will be appreciated that threads such as the CSD polling threads can be created as a part of system startup (e.g., when the storage device is powered on or the like). That is, in normal operating conditions, the polling threads can be created during the storage device/subsystem power up and can run until power shutdown. It will be appreciated that the polling threads (and/or additional polling thread(s)) can also be started e.g., via a reset mechanism.

In an embodiment, applications can be represented as a series of work chunks. A work chunk can be a piece of the work the host 133 may otherwise do but handled over to the memory accelerator 121 or CSD 112 or both (112, 121) to be done. A work chunk can be represented as an object function that includes identification of an executable object containing function(s) to be executed, and identification of data object(s) to be processed by the function(s). For example, a work chunk can be represented as objectFunction (objectId1, offset, objectId2), where objectId1 can be the identification of the executable object containing the function to be executed on the remote device (e.g., the storage subsystem 110 or the memory subsystem 120), offset can be the offset into the executable object that remote device can use to start execution, and objectId2 can be the identification of the data object to process. It will be appreciated that a work chunk can be represented as message(s) (e.g., a remote execution API or the like) having any suitable size and/or format, for example, to allow a number of parameters to be passed. Work chunk(s) can be executed in independent work space (e.g., in the host 133, in the memory accelerator 121, and/or in the CSD 112) to achieve protection, isolation, and/or security or policy implementation.

It will be appreciated that the application program can control the tasks for different parts of the computational storage system. For example, application program can take all the functions that need to run in the storage system to write a shared library in the storage that contains all the code. When compiling the program and linking against the library, the library can be moved to the storage so that different parts of the computational storage system can pick the library up when the application program is running. It will be appreciated that the remote object code (116 and/or 118) can be created (1) as a part of application compilation, where the compiler can create multiple object files one to run on each computational system (133, 121, 112), and the object files for 121 and/or 112 can be moved into the object store; and/or (2) by users building shared objects that run on 121 and/or 112 and placing the shared object into the object store. This is because current applications link against the shared objects that provide functions to the application does not typically create from scratch (e.g., printf is in libc). During application linking, those remote execution shared objects can be used to satisfy function references and used during application execution.

In an embodiment, the data object 114 (e.g., object 1) can be copied or moved to the host 133 to be processed by the host 133, and the resultant data object 114A (e.g., object 1A) can be saved in the object store in the storage subsystem 110. It will be appreciated that in such embodiment, when the code/functions of the work chunk (the code objects) are processed on the host, the code/functions can be part of the "normal" application object code and can be copied/moved to and can reside in the host memory/cache.

In an embodiment, the data object 114 (e.g., object 1) can be copied or moved to the memory of the memory subsystem 120 as data object 124A (e.g., object 1), the data object 124A can be copied or moved to the host 133 to be processed by the host, the resultant data object 124B (e.g., object 1A) can be saved in the memory subsystem 120 and/or saved as data object 114A (e.g., object 1A) in the object store of the storage subsystem 110. It will be appreciated that in such embodiment, the code/functions of the work chunk (the code objects) can be mapped into the host virtual memory space and accessed in the same manner as host memory (and placed in the host caches). That is, the code processing can be on the host, the code can also be part of the "normal" application object code and can reside in the host memory/cache.

In an embodiment, the data object 114 (e.g., object 1) can be copied or moved to the memory of the memory subsystem 120 as data object 124A (e.g., object 1), the address of the data object 124A can be mapped (e.g., via CXL to maintain memory coherency between the host memory space and the memory on the memory subsystem 120) to be accessible by the host 133 so that the data object 124A can be processed by the host, the resultant data object 124B (e.g., object 1A) can be saved in the memory subsystem 120 and/or saved as data object 114A (e.g., object 1A) in the object store in the storage subsystem 110. It will be appreciated that in such embodiment, the code/functions of the work chunk (the code objects) can be mapped into the host virtual memory space and accessed in the same manner as host memory (and placed in the host caches). That is, the code processing can be on the host, the code can also be part of the "normal" application object code and can reside in the host memory/cache.

In an embodiment, the host 133 can send work chunk(s) to the memory accelerator 121. The memory accelerator 121 can access the data object 114 (e.g., object 2) and the executable object 118 (e.g., code for the memory accelerator 121) based on the received work chunk(s) (e.g., by copying or reading the data object 114 and the executable object 118 into the memory of the memory accelerator 121), process the data object 114 by executing the executable object 118 against the data object 114 locally (e.g., in the memory of the memory accelerator 121), and save the resultant data object 114A (e.g., object 2A) into the object store of the storage subsystem 110.

In an embodiment, the host 133 can send work chunk(s) to the CSD 112. The CSD 112 can access the data object 114 (e.g., object 3) and the executable object 116 (e.g., code for the CSD 112) based on the received work chunk(s) (e.g., by copying or reading the data object 114 and the executable object 116 into the memory of the CSD 112 or in the memory of the microcontroller of the storage subsystem 110), process the data object 114 by executing the executable object 116 against the data object 114 locally (e.g., in the memory of the CSD 112 or in the memory of the microcontroller of the storage subsystem 110), and save the resultant data object 114A (e.g., object 3A) into the object store of the storage subsystem 110.

In an embodiment, the resultant data object(s) 114A (e.g., objects 1A, 2A, and/or 3A) can be smaller in size than the data object(s) 114 (e.g., objects 1, 2, and/or 3), respectively. In another embodiment, the resultant data object(s) 114A (e.g., objects 1A, 2A, and/or 3A) can be the same or larger in size than the data object(s) 114 (e.g., objects 1, 2, and/or 3), respectively. It will be appreciated that by processing the data object(s) 114 locally (at the storage subsystem 110 level or at the memory subsystem 120), data movement in the computational storage system can be significantly reduced.

Figure 2A:
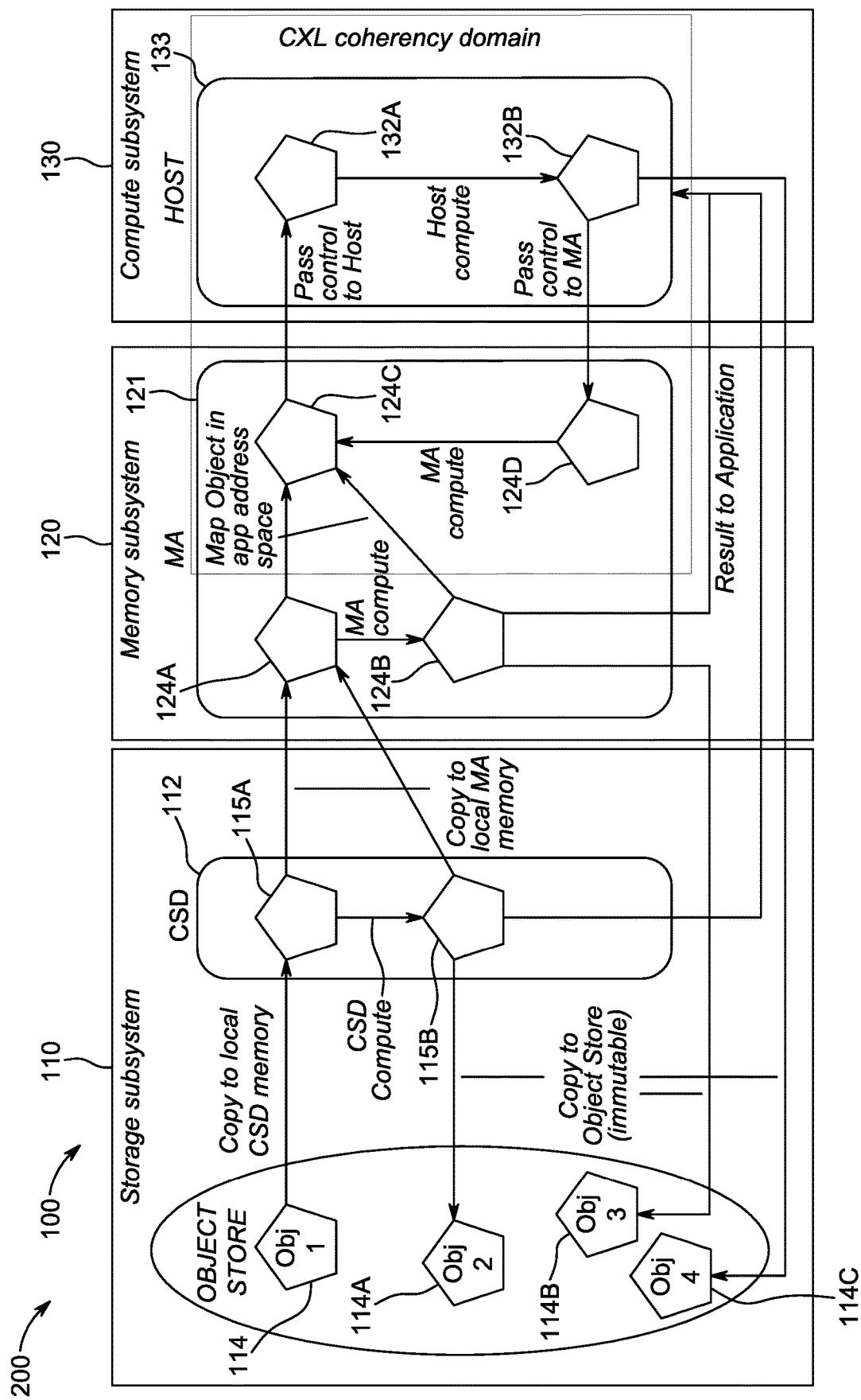
FIG. 2A is a block diagram illustrating object process flow(s) at different levels of a computing system, according to an embodiment.
Figure 2B:
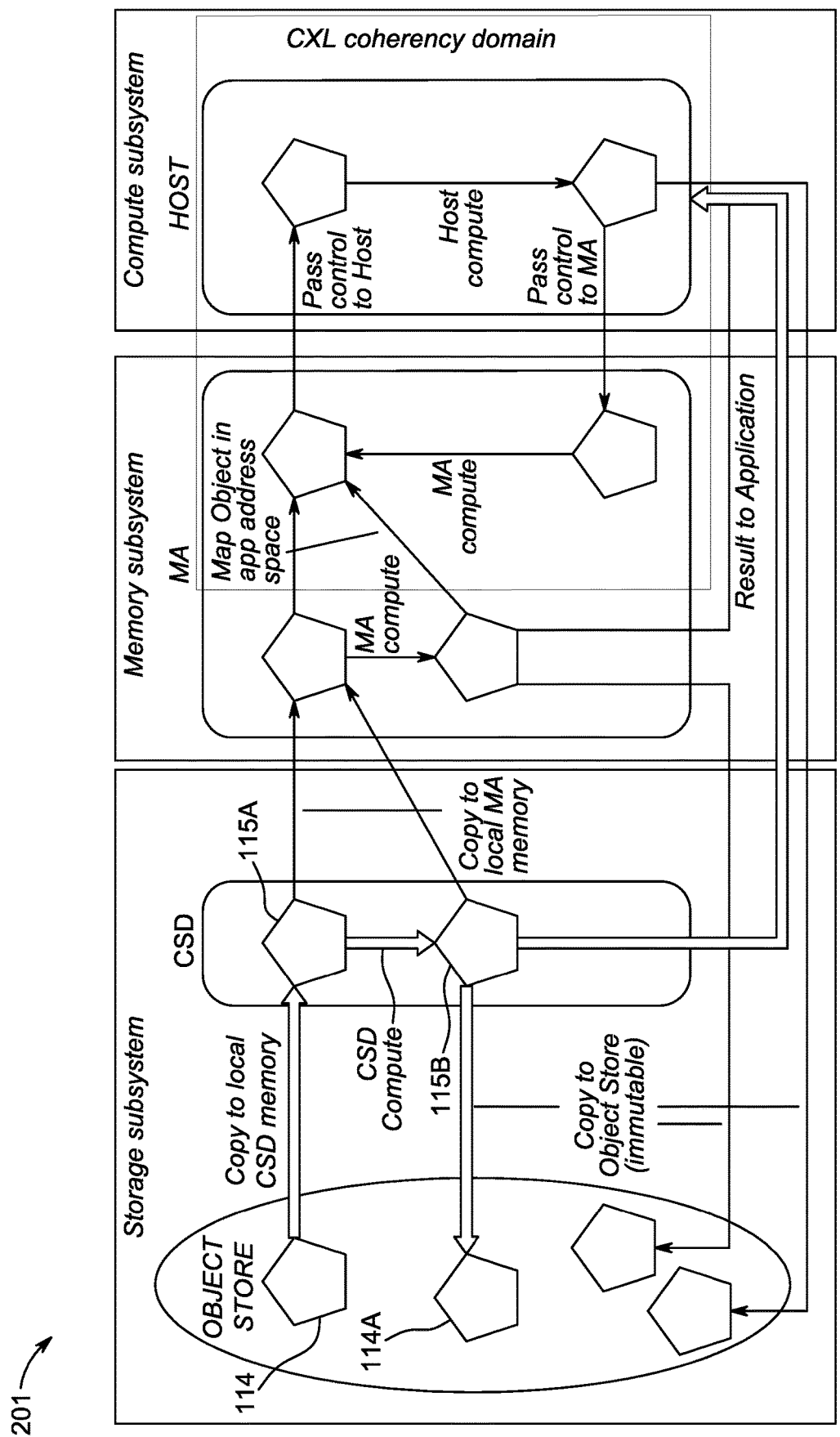
FIG. 2B is a block diagram illustrating object process flow(s) at the storage subsystem level of the computing system, according to an embodiment.
Figure 2C:
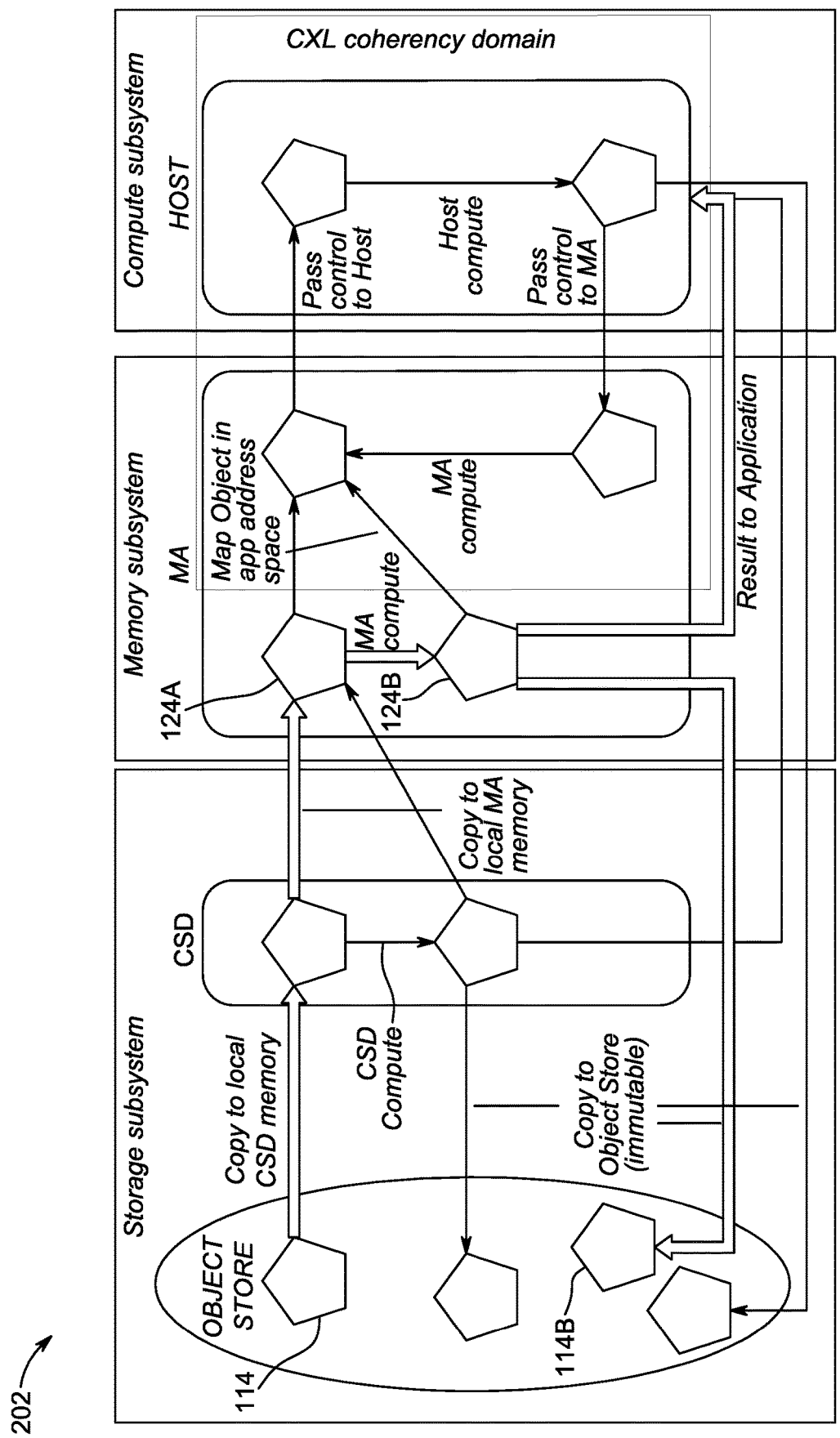
FIG. 2C is a block diagram illustrating object process flow(s) at the memory subsystem level of the computing system, according to an embodiment.
Figure 2D:
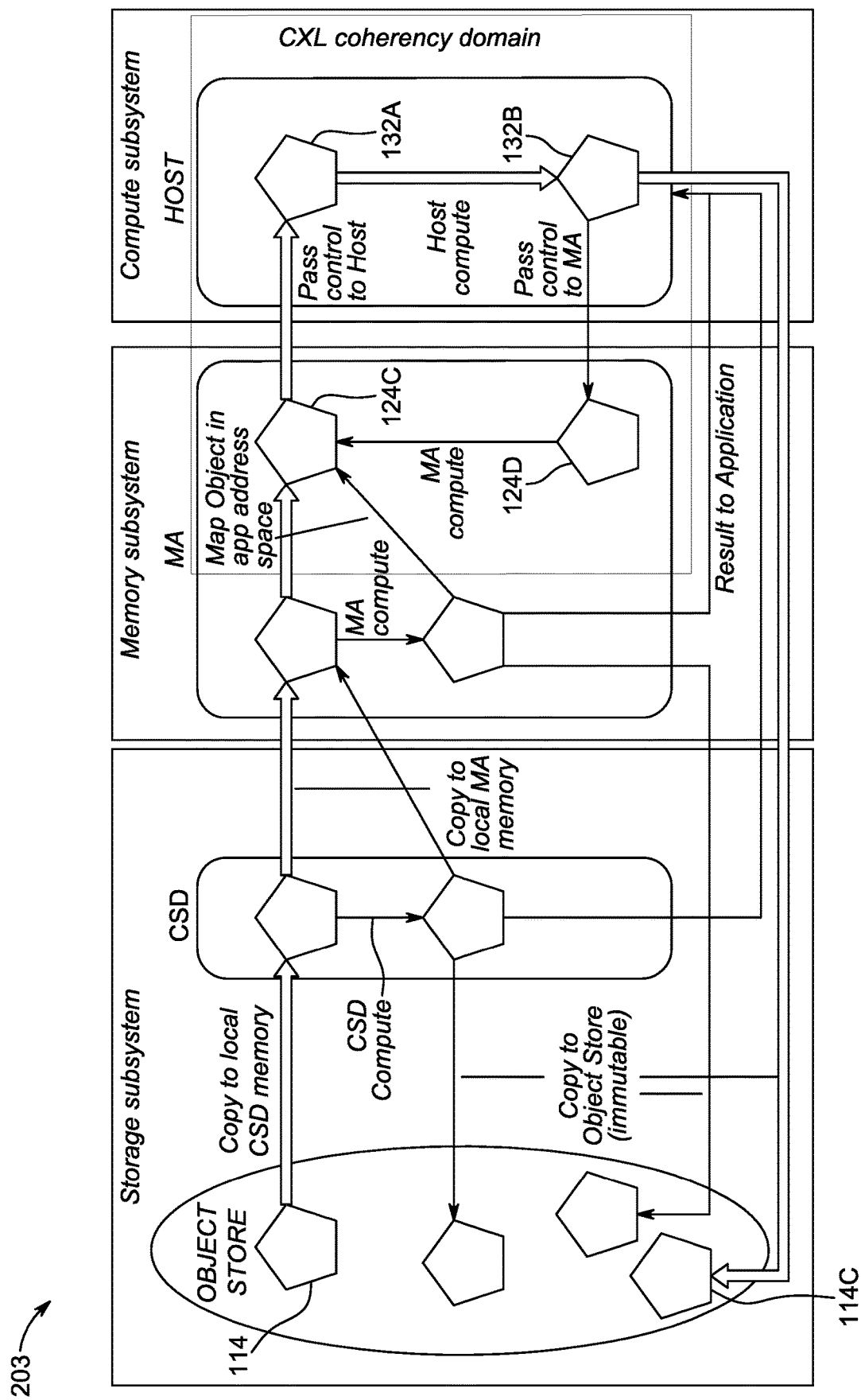
FIG. 2D is a block diagram illustrating object process flow(s) at the host level of the computing system, according to an embodiment.
Figure 2E:
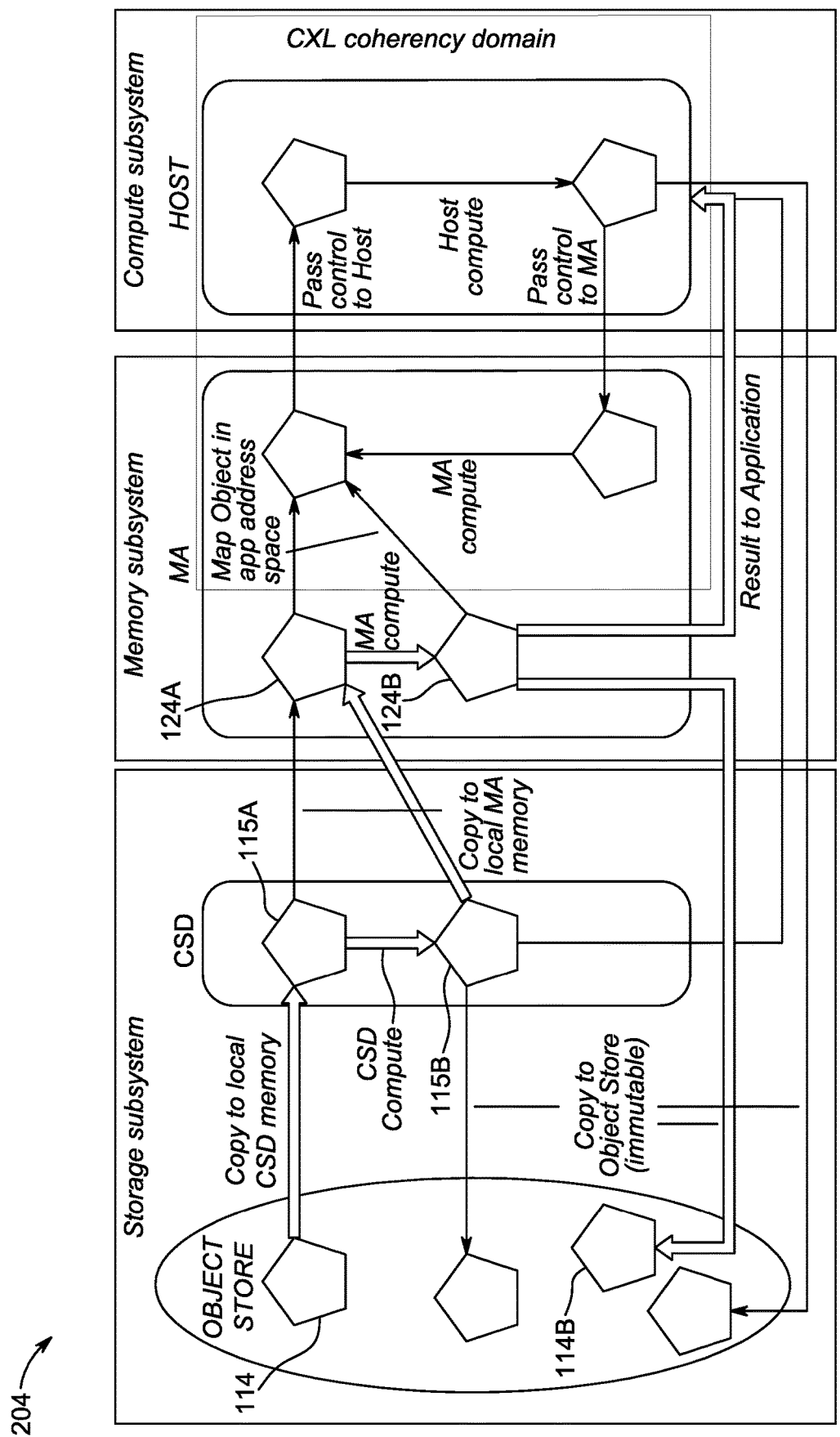
FIG. 2E is a block diagram illustrating object process flow(s) at the storage subsystem level and at the memory subsystem level of the computing system, according to an embodiment.
Figure 2F:
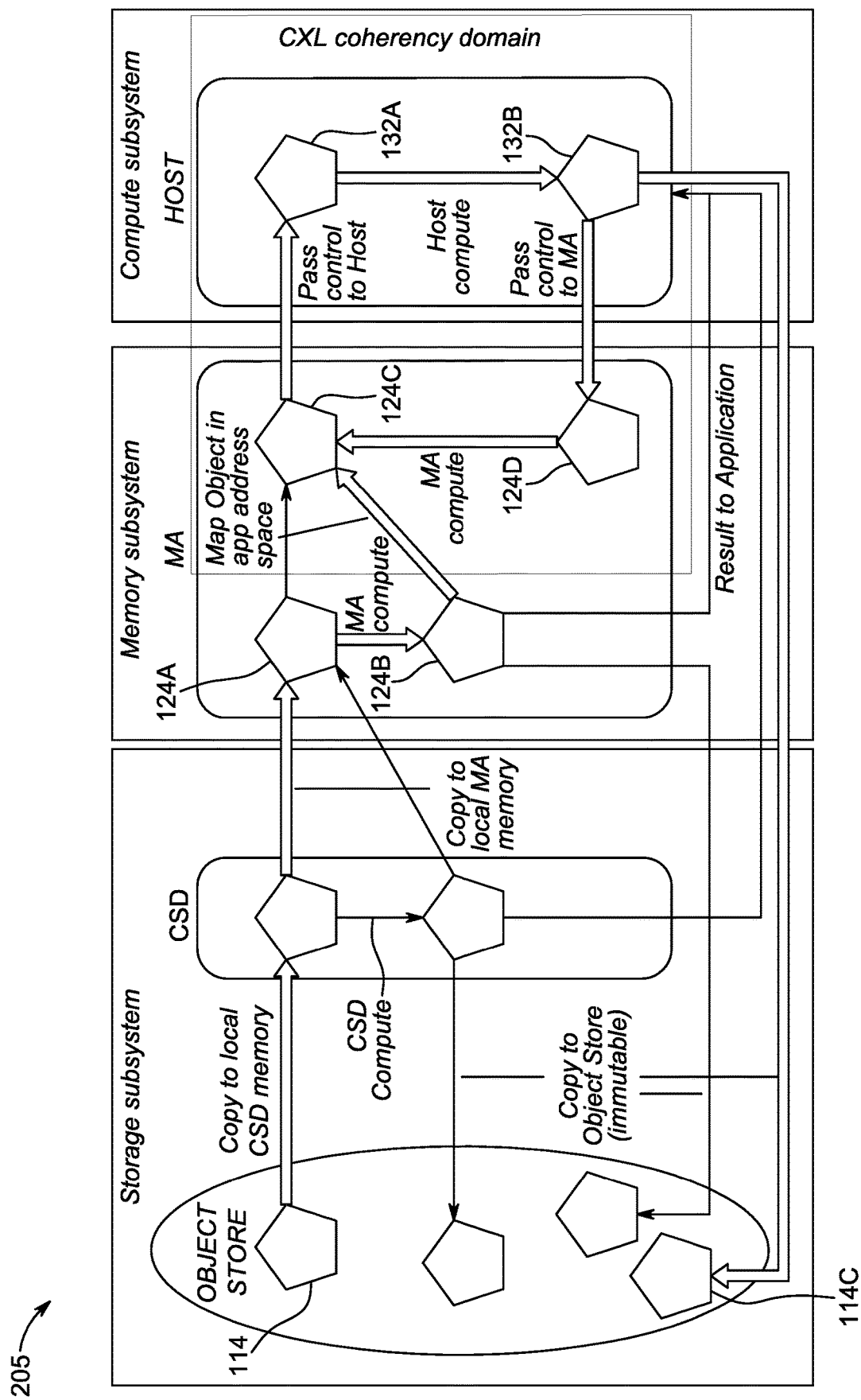
FIG. 2F is a block diagram illustrating object process flow(s) at the memory subsystem level and at the host level of the computing system, according to an embodiment.
Figure 2G:
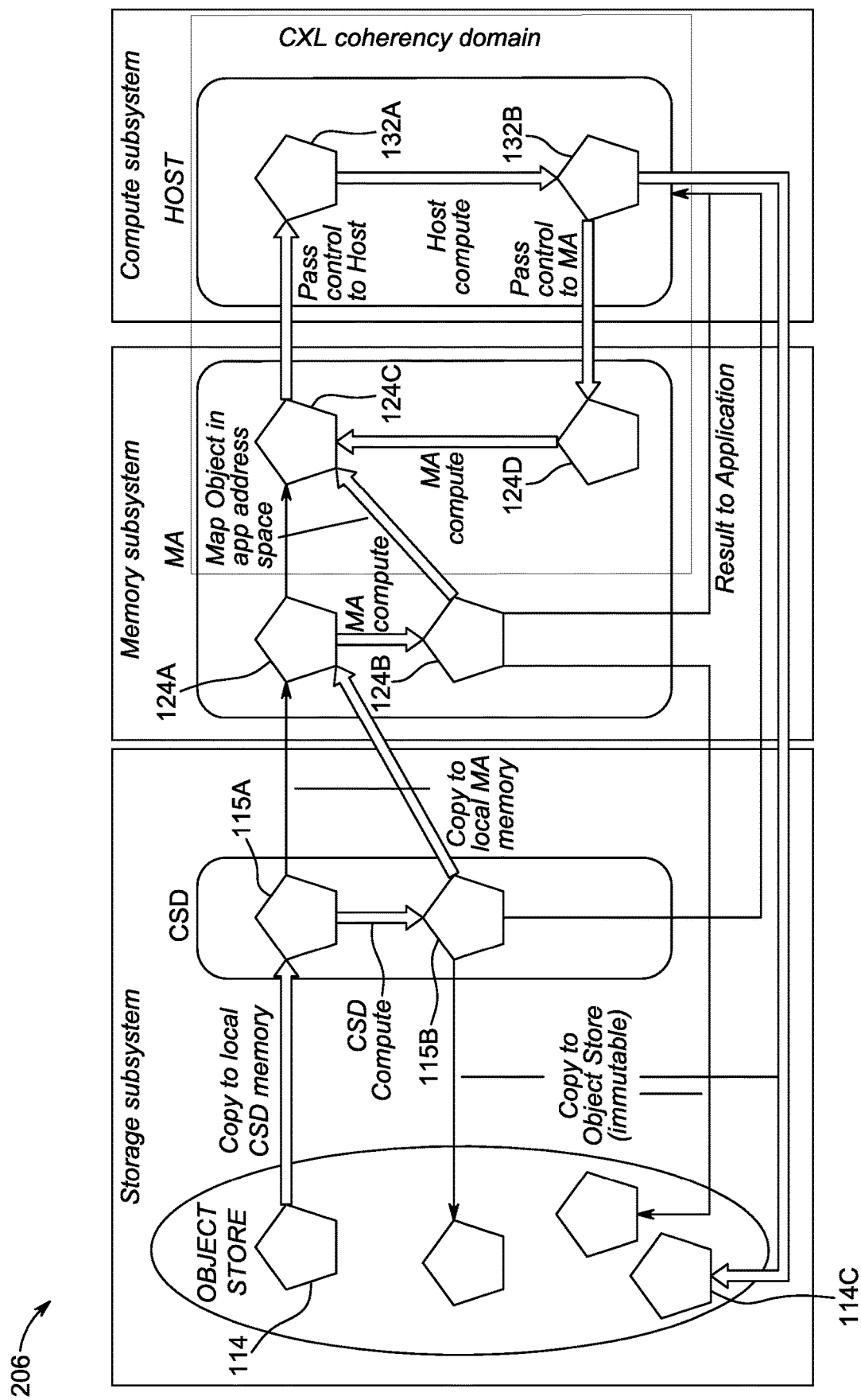
FIG. 2G is a block diagram illustrating object process flow(s) at the storage subsystem level, at the memory subsystem level, and at the host level of the computing system, according to an embodiment.

FIG. 2A is a block diagram 200 illustrating object process flow(s) at different levels of a computing system 100, according to an embodiment. FIG. 2B is a block diagram 201 illustrating object process flow(s) at the storage subsystem 110 level of the computing system 100, according to an embodiment. FIG. 2C is a block diagram 202 illustrating object process flow(s) at the memory subsystem 120 level of the computing system 100, according to an embodiment. FIG. 2D is a block diagram 203 illustrating object process flow(s) at the host 133 level of the computing system 100, according to an embodiment. FIG. 2E is a block diagram 204 illustrating object process flow(s) at the storage subsystem 110 level and at the memory subsystem 120 level of the computing system 100, according to an embodiment. FIG. 2F is a block diagram 205 illustrating object process flow(s) at the memory subsystem 120 level and at the host 133 level of the computing system 100, according to an embodiment. FIG. 2G is a block diagram 206 illustrating object process flow(s) at the storage subsystem 110 level, at the memory subsystem 120 level, and at the host 133 level of the computing system 100, according to an embodiment.

As shown in FIG. 2A (see also the description of FIG. 1), the computing system 100 includes a storage subsystem 110, a memory subsystem 120, and a computing subsystem 130. The computing subsystem 130 includes a host 133. The memory subsystem 120 can include volatile memory (e.g., DRAM or the like, not shown) and memory accelerator(s) 121 (or memory controllers or the like). In an embodiment, the storage subsystem 110 is a computational storage subsystem having a controller (not shown) and a storage (not shown). The controller can be a low-cost, low-power commodity microcontroller such as an Internet of things (IoT) microcontroller or any suitable microcontroller. The storage can be NAND flash memory, SSD, or any suitable non-volatile memory. The storage can be configured as object storage or object store. It will be appreciated that in some embodiments, the controller can be embedded low power processor(s) and/or accelerator(s).

In FIG. 2A, objects (114, 114A-114D) are stored in the object store of the storage subsystem 110, objects (115A-115B) are stored in the memory of the CSD 112 (or in the memory of the microcontroller of the storage subsystem 110), objects (124A-124B) are stored in the memory of the memory subsystem 120, objects (124C-124D) are stored in the memory of the memory subsystem 120 and their address can be mapped (e.g., via CXL to maintain memory coherency between the host memory space and the memory on the memory subsystem 120) to be accessible by the host 133, objects (132A-132B) are either stored in the memory of host 133 or stored in the memory subsystem 120 but accessed (e.g., via CXL to maintain memory coherency between the host memory space and the memory on the memory subsystem 120) by the host 133.

As shown in FIGS. 2A and 2B, the CSD 112 can perform work chunk(s) received from the host 133 to e.g., filter and/or search object(s), e.g., finding graph data in a large (and potentially distributed) dataset. The work chunk(s) can include identification(s) of executable object(s) including e.g., functions to filter and/or search data object(s), and identification(s) of data object(s) 114 (e.g., object 1).

The CSD 112 can locate the data object 114 in the object store of the storage subsystem 110 via the identification of the data object (as indicated in the work chunk(s)), and obtain a copy of the data object 114 in the CSD 112 or in a memory of microcontroller of the storage subsystem 110. The copy of the data object 114 is shown as data object 115A.

The CSD 112 can also locate the executable object (not shown, see descriptions of FIG. 1) in the object store of the storage subsystem 110 via the identification of the executable object (as indicated in the work chunk(s)), obtain a copy of the executable object in the CSD 112 or in the memory of the microcontroller, and execute functions in the executable object against/on the data object 115A in the CSD 112 or in the memory of the microcontroller to generate a resultant data object 115B. In an embodiment, functions in the executable object can be e.g., searching and/or filtering data in the data object 115A and putting the results in a new (mutable) object 115B. The CSD 112 can further convey the result object 115B to a destination of the computational storage system, for example, (1) saving the result object 115B (i.e., copying the result object 115B into object store as object 114A and making the object 114A immutable), (2) returning (mutable) object 115B to the host 133, and/or (3) returning a value of the object 115B value to the host 133.

As shown in FIGS. 2A and 2C, the memory accelerator 121 can perform work chunk(s) received from the host 133 to e.g., conduct breadth first search (BFS) on a graph, to convert data types into a machine readable form, and to perform object reduction. The work chunk(s) can include identification(s) of executable object(s) including functions e.g., to conduct BFS on the graph data object(s), and identification(s) of data object(s) 114 (e.g., object 1).

The memory accelerator 121 can locate the data object 114 in the object store of the storage subsystem 110 via the identification of the data object (as indicated in the work chunk(s)), and obtain a copy of the data object 114 in the memory accelerator 121 or in a memory of memory subsystem 120. The copy of the data object 114 is shown as data object 124A (now mutable).

The memory accelerator 121 can also locate the executable object (not shown, see descriptions of FIG. 1) in the object store of the storage subsystem 110 via the identification of the executable object (as indicated in the work chunk(s)), obtain a copy of the executable object in the memory accelerator 121 or in the memory of the memory subsystem 120, and execute functions in the executable object against/on the data object 124A in the memory accelerator 121 or in the memory of the memory subsystem to generate a resultant data object 124B.

In an embodiment, functions in the executable object can be e.g., low locality computation (e.g., cooperation and/or communication across memory accelerator 121 possible) including e.g., converting data types of the data object 124A into a machine readable form, performing reduction operations on data object 124A, and performing single access functions (e.g. the BFS or the like). The memory accelerator 121 can further convey the result object 124B to a destination of the computational storage system, for example, (1) saving the result object 124B (i.e., copying the result object 124B into object store as object 114B and making the object 114B immutable), (2) returning (mutable) object 124B to the host 133, and/or (3) returning a value of the object 124B value to the host 133.

As shown in FIGS. 2A and 2D, the host 133 can perform work chunk(s) as an execution or running of an application to e.g., conduct linear algebra operation(s) on arrays in the object(s). The work chunk(s) can include identification(s) of executable object(s) including functions e.g., to conduct linear algebra operation(s), and identification(s) of data object(s) 114 (e.g., object 1).

The host 133 can locate the data object 114 in the object store of the storage subsystem 110 via the identification of the data object (as indicated in the work chunk(s)), and obtain a copy of the data object 114 in the memory accelerator 121 or in the memory of the memory subsystem 120. The copy of the data object 114 is shown as data object 124C (now mutable). The address of the object 124C can be mapped (e.g., by the memory accelerator 121 or the like) into the application address space (physical or virtual, accessible by the host 133 and can be shared by multiple hosts) to correspond to object 132A, and the memory accelerator 121 can then pass control to the host 133.

In another embodiment, it will be appreciated that the host 133 can obtain a copy of the data object 114 in the memory/cache of the host 133, and the copy of the data object 114 can be shown as data object 132A (now mutable).

The host 133 can also locate the executable object (not shown, see descriptions of FIG. 1) in the object store of the storage subsystem 110 via the identification of the executable object (as indicated in the work chunk(s)), obtain a copy of the executable object in the memory accelerator 121 or in the memory of the memory subsystem 120 (with the address of the executable object being mapped into the application address space), and execute functions in the executable object against/on the data object 132A in the address space (i.e., the object 124C in the memory accelerator 121 or in the memory of the memory subsystem) to generate a resultant data object 132B in the address space (i.e., the object 124D in the memory accelerator 121 or in the memory of the memory subsystem). In another embodiment, it will be appreciated that the host can obtain a copy of the executable object in the memory/cache of the host 133 and execute functions in the executable object against the data object 132A in the memory/cache of the host 133, and the resultant data object 132B can be in the memory/cache of the host 133.

In an embodiment, functions in the executable object can be e.g., computing high locality operation(s) on the host 133 including e.g., treating the data object (132B or 124D) as an array and performing dense and/or sparse linear algebra operation(s). The host 133 can further convey the result object 132B (or 124D) to a destination of the computational storage system, for example, (1) saving the result object 132B (i.e., copying the result object 132B into object store as object 114C and making the object 114C immutable), and/or (2) returning control to the host 133 if memory accelerator 121 has the control.

In an embodiment, both the storage subsystem 110 and the memory subsystem 120 can be involved in running work chunk(s) for more complicated application(s), such as graph analytics, fraud detection, or the like. It will be appreciated that graph analytics (or graph algorithms) can be used to determine a strength and direction of relationships between objects in a graph. Fraud detection can be a knowledge-intensive activity, especially in artificial intelligence areas. Graph analytics and fraud detection can be complicated applications. As shown in FIGS. 2A and 2E, the CSD 112 can perform work chunk(s) received from the host 133 to e.g., search, filter, and/or compress data in object(s). The work chunk(s) can include identification(s) of executable object(s) including functions to e.g., search, filter, and/or compress data object(s), and identification(s) of data object(s) 114 (e.g., object 1).

The CSD 112 can locate the data object 114 in the object store of the storage subsystem 110 via the identification of the data object (as indicated in the work chunk(s)), and obtain a copy of the data object 114 in the CSD 112 or in a memory of microcontroller of the storage subsystem 110. The copy of the data object 114 is shown as data object 115A.

The CSD 112 can also locate the executable object (not shown, see descriptions of FIG. 1) in the object store of the storage subsystem 110 via the identification of the executable object (as indicated in the work chunk(s)), obtain a copy of the executable object in the CSD 112 or in the memory of the microcontroller, and execute functions in the executable object against/on the data object 115A in the CSD 112 or in the memory of the microcontroller to generate a resultant data object 115B. In an embodiment, functions in the executable object can be e.g., searching, filtering, and/or compressing data in the data object 115A and putting the compressed results in a new (mutable) object 115B. The CSD 112 can further convey the result object 115B to a destination of the computational storage system, for example, move the object 115B to the memory accelerator 121 or to a memory of memory subsystem 120.

In an embodiment, the memory accelerator 121 can perform work chunk(s) received from the host 133 to e.g., conduct graph analytics on the object(s). The work chunk(s) can include identification(s) of executable object(s) including functions to e.g., conduct graph analytics on the graph data object(s), and identification(s) of data object(s) 115B.

The memory accelerator 121 can locate the data object 115B in the CSD 112 via the identification of the data object (as indicated in the work chunk(s)), and obtain a copy of the data object 115B in the memory accelerator 121 or in a memory of memory subsystem 120. The copy of the data object 115B is shown as data object 124A (mutable).

The memory accelerator 121 can also locate the executable object (not shown, see descriptions of FIG. 1) in the object store of the storage subsystem 110 via the identification of the executable object (as indicated in the work chunk(s)), obtain a copy of the executable object in the memory accelerator 121 or in the memory of the memory subsystem 120, and execute functions in the executable object against/on the data object 124A in the memory accelerator 121 or in the memory of the memory subsystem to generate a resultant data object 124B.

In an embodiment, functions in the executable object can be e.g., low locality computation (e.g., cooperation and/or communication across memory accelerator 121 possible) including e.g., conducting graph analytics on the object(s). The memory accelerator 121 can further convey the result object 124B to a destination of the computational storage system, for example, (1) saving the result object 124B (i.e., copying the result object 124B into object store as object 114B and making the object 114B immutable), (2) returning (mutable) object 124B to the host 133, and/or (3) returning a value of the object 124B value to the host 133.

In an embodiment, both the memory subsystem 120 and the host 133 can be involved in running work chunk(s) for more complicated application(s), such as graph analysis, fraud detection, or the like. As shown in FIGS. 2A and 2F, the memory accelerator 121 can perform work chunk(s) received from the host 133 to e.g., conduct functions or operations on the object(s). The work chunk(s) can include identification(s) of executable object(s) including functions to conduct functions or operations on the data object(s), and identification(s) of data object(s) 114 (e.g., object 1).

The memory accelerator 121 can locate the data object 114 in the object store of the storage subsystem 110 via the identification of the data object (as indicated in the work chunk(s)), and obtain a copy of the data object 114 in the memory accelerator 121 or in a memory of memory subsystem 120. The copy of the data object 114 is shown as data object 124A (now mutable).

The memory accelerator 121 can also locate the executable object (not shown, see descriptions of FIG. 1) in the object store of the storage subsystem 110 via the identification of the executable object (as indicated in the work chunk(s)), obtain a copy of the executable object in the memory accelerator 121 or in the memory of the memory subsystem 120, and execute functions in the executable object against/on the data object 124A in the memory accelerator 121 or in the memory of the memory subsystem to generate a resultant data object 124B.

In an embodiment, functions in the executable object can be e.g., low locality computation (e.g., cooperation and/or communication across memory accelerator 121 possible). The memory accelerator 121 can further convey the result object 124B to a destination of the computational storage system, for example, mapping the address of the object 124B into the application address space as object 124C (accessible by the host 133 and can be shared by multiple hosts) to correspond to object 132A. The object (124C, 132A) is shared between the memory accelerator 121 and the host 133 via CXL which can enforce coherency.

It will be appreciated that when the host 133 is performing tasks or has the control (e.g., running functions in the executable object(s)), the control is passed from the memory accelerator 121 to the host 133, and the host 133 runs functions against the virtual object 132A (or the object 124C in the application address space). When the memory accelerator 121 is performing tasks or has the control (e.g., running functions in the executable object(s)), the control is passed from the host 133 to the memory accelerator 121, and the memory accelerator 121 runs functions against the object 124C in the application address space. In an embodiment, the memory accelerator 121 can perform e.g., updates generated by the host 133 (e.g., the memory accelerator serialization point for multiple hosts updating, or the like), and the control can be passed based on computational phases. For example, the memory accelerator 121 can pass the control to the host 133, and the host 133 can perform e.g., host bound functions against the object 132A (or the object 124C in the application address space) to generate a resultant data object 132B in the address space (i.e., the object 124D in the memory accelerator 121 or in the memory of the memory subsystem). Then the host 133 can pass the control to the memory accelerator 121, and the memory accelerator 121 can perform low locality functions against the object 124D to generate a resultant data object 124C (to replace/update the previous 124C).

The host 133 and the memory accelerator 121 can perform work chunk(s) as an execution or running of an application to e.g., conduct linear algebra operation(s) on arrays in the object(s). The work chunk(s) can include identification(s) of executable object(s) and identification(s) of data object(s) (e.g., in the memory accelerator 121 or in the memory of the memory subsystem).

The host 133 and the memory accelerator 121 can locate the data object(s) in the object store of the memory subsystem 120 via the identification of the data object (as indicated in the work chunk(s)). The host 133 and the memory accelerator 121 can also locate the executable object (not shown, see descriptions of FIG. 1) in the object store of the storage subsystem 110 via the identification of the executable object (as indicated in the work chunk(s)), obtain a copy of the executable object in the memory accelerator 121 or in the memory of the memory subsystem 120 (with the address of the executable object being mapped into the application address space) or in the memory/cache of the host 133, and execute functions in the executable object against/on the data objects in the address space or in the memory/cache of the host 133 to generate a resultant data object (132B or the updated 124C) in the address space or in the memory/cache of the host 133.

The host 133 can further convey the result object 132B to a destination of the computational storage system, for example, (1) saving the result object 132B (i.e., copying the result object 132B into object store as object 114C and making the object 114C immutable), and/or (2) returning control to the host 133 if memory accelerator 121 has the control.

In an embodiment, the storage subsystem 110, the memory subsystem 120, and the host 133 can be involved in running work chunk(s) for more complicated application(s), such as support triggered operations, operations on multi-petabyte raw data file, or the like. As shown in FIGS. 2A and 2G, the CSD 112 can perform work chunk(s) received from the host 133 to e.g., search, filter, and/or compress data in object(s). The work chunk(s) can include identification(s) of executable object(s) including functions to e.g., search, filter, and/or compress data object(s), and identification(s) of data object(s) 114 (e.g., object 1).

The CSD 112 can locate the data object 114 in the object store of the storage subsystem 110 via the identification of the data object (as indicated in the work chunk(s)), and obtain a copy of the data object 114 in the CSD 112 or in a memory of microcontroller of the storage subsystem 110. The copy of the data object 114 is shown as data object 115A.

The CSD 112 can also locate the executable object (not shown, see descriptions of FIG. 1) in the object store of the storage subsystem 110 via the identification of the executable object (as indicated in the work chunk(s)), obtain a copy of the executable object in the CSD 112 or in the memory of the microcontroller, and execute functions in the executable object against/on the data object 115A in the CSD 112 or in the memory of the microcontroller to generate a resultant data object 115B. In an embodiment, functions in the executable object can be e.g., searching, filtering, and/or compressing data in the data object 115A and putting the compressed results in a new (mutable) object 115B. The CSD 112 can further convey the result object 115B to a destination of the computational storage system, for example, move the object 115B to the memory accelerator 121 or to a memory of memory subsystem 120.

In an embodiment, the memory accelerator 121 can perform work chunk(s) received from the host 133 to e.g., conduct operations or functions on the object(s). The work chunk(s) can include identification(s) of executable object(s)

including functions to conduct operations or functions on the data object(s), and identification(s) of data object(s) 115B.

The memory accelerator 121 can locate the data object 115B in the CSD 112 via the identification of the data object (as indicated in the work chunk(s)), and obtain a copy of the data object 115B in the memory accelerator 121 or in a memory of memory subsystem 120. The copy of the data object 115B is shown as data object 124A (mutable). It will be appreciated that the data object 115B can also be moved (instead of copied) to the memory accelerator 121 or in a memory of memory subsystem 120 as data object 124A.

The memory accelerator 121 can also locate the executable object (not shown, see descriptions of FIG. 1) in the object store of the storage subsystem 110 via the identification of the executable object (as indicated in the work chunk(s)), obtain a copy of the executable object in the memory accelerator 121 or in the memory of the memory subsystem 120, and execute functions in the executable object against/on the data object 124A in the memory accelerator 121 or in the memory of the memory subsystem to generate a resultant data object 124B.

In an embodiment, functions in the executable object can be e.g., low locality computation (e.g., cooperation and/or communication across memory accelerator 121 possible). The memory accelerator 121 can further convey the result object 124B to a destination of the computational storage system, for example, mapping the address of the object 124B into the application address space as object 124C (accessible by the host 133 and can be shared by multiple hosts) to correspond to object 132A. The object (124C, 132A) is shared between the memory accelerator 121 and the host 133 via CXL which can enforce coherency.

It will be appreciated that when the host 133 is performing tasks or has the control (e.g., running functions in the executable object(s)), the control is passed from the memory accelerator 121 to the host 133, and the host 133 runs functions against the virtual object 132A (or the object 124C in the application address space). When the memory accelerator 121 is performing tasks or has the control (e.g., running functions in the executable object(s)), the control is passed from the host 133 to the memory accelerator 121, and the memory accelerator 121 runs functions against the object 124C in the application address space.

In an embodiment, the memory accelerator 121 can perform e.g., memory bound functions, and the control can be passed based on computational phases. For example, the memory accelerator 121 can pass the control to the host 133, and the host 133 can perform e.g., computationally intensive functions against the object 132A (or the object 124C in the application address space) to generate a resultant data object 132B in the address space (or the object 124D in the memory accelerator 121 or in the memory of the memory subsystem). Then the host 133 can pass the control to the memory accelerator 121, and the memory accelerator 121 can perform low locality functions against the object 124D to generate a resultant data object 124C (to replace/update the previous 124C).

The host 133 and the memory accelerator 121 can perform work chunk(s) as an execution or running of an application. The work chunk(s) can include identification(s) of executable object(s) and identification(s) of data object(s) (e.g., in the memory accelerator 121 or in the memory of the memory subsystem).

The host 133 and the memory accelerator 121 can locate the data object(s) in the object store of the memory subsystem 120 via the identification of the data object (as indicated in the work chunk(s)). The host 133 and the memory accelerator 121 can also locate the executable object (not shown, see descriptions of FIG. 1) in the object store of the storage subsystem 110 via the identification of the executable object (as indicated in the work chunk(s)), obtain a copy of the executable object in the memory accelerator 121 or in the memory of the memory subsystem 120 (with the address of the executable object being mapped into the application address space) or in the memory/cache of the host 133, and execute functions in the executable object against/on the data objects in the address space to generate a resultant data object (132B or updated 124C) in the address space or in the memory/cache of the host 133.

The host 133 can further convey the result object 132B to a destination of the computational storage system, for example, (1) saving the result object 132B (i.e., copying the result object 132B into object store as object 114C and making the object 114C immutable), and/or (2) returning control to the host 133 if memory accelerator 121 has the control.

It will be appreciated that in an embodiment, depending on the frequency the data is accessed or processed, one or more of the storage subsystem 110, the memory subsystem 120, and the host 133 can be involved in running work chunk(s). For example, threshold(s) of the frequency can be used to determine where to run the work chunk (e.g., using the host for more frequent access, using the storage subsystem for less frequency access, using the memory subsystem for medium frequent access, or the like).

Embodiments disclosed herein can provide system(s) and method(s) using a global object space to limit data movement (e.g., moving work to data not vice versa); using the object meta-data to improve permission and/or access control; and using the objects store structure to simplify remote execution, for example, by simplifying data coherence by limiting sharing (e.g., only allowing modification at one physical place at a time), by compute-in-data (i.e., moving and/or applying the application to the data) working on objects not mapped into application address space, by building and executing in a local address space at the remote computation unit (which only knows about objects and/or to which application address space is not visible), and/or by requiring remote operation available at computational unit.

Embodiments disclosed herein can provide system(s) (e.g., the storage subsystem, the memory subsystem, or the like) having processing capability so that they can access the data locally (e.g., in their corresponding own memory) without moving the data to the host, and can perform the operation(s) locally to benefit the host (e.g., shrinking the data such as filtering the data that are needed, transforming or converting data format to machine readable format locally, or the like). Embodiments disclosed herein can separate different address spaces and treat them as separate machines, and ease hardware and software capability required (e.g., only need to deal with objects), instead of extending virtual memory space (used by application extending the address space at cost of storage and memory interface) across the subsystems to keep everything coherent (which may require complex software and hardware).

Compared with traditional systems, embodiments disclosed herein can push a certain portion of the program out into the storage subsystem and execute it there with no information traveling back to the host processor until the result is found or generated. Embodiments disclosed herein can also provide hardware to support the algorithm/software which requires a larger, more integrated, MCU (which can access or process object(s) instead of blocks) than a typical IO processor or FPGA. Embodiments disclosed herein can further provide a more distributed infrastructure which is better optimized for keeping the data local and keeping movement of data local, without a need to support backward block compatibility. Embodiments disclosed herein can also provide predictability to the object access or operation, compared with cloud object access, where the IO processor, the FPG, or other processor(s) are not enabled to look into the actual data in the object, which is typically encrypted by the customer for security, privacy, or liability issues.

Aspects:

It is appreciated that any of aspects 1-10 and 11-20 can be combined with each other.

Aspect 1. A computational storage system comprising:
a storage subsystem having a controller and a storage, wherein the controller is configured to:
receive a work chunk from a host, the work chunk including identification of an executable object and identification of a data object;
locate the data object in the storage via the identification of the data object;
obtain a copy of the data object in a memory of the controller;
execute functions in the executable object on the data object in the memory of the controller to generate a result object; and
convey the result object to a destination of the computational storage system.

Aspect 2. The computational storage system according to aspect 1, wherein the controller is further configured to:
generate a polling thread in the memory of the controller to receive the work chunk from the host.

Aspect 3. The computational storage system according to aspect 1 or aspect 2, wherein the controller is further configured to:
obtain a copy of the executable object in the memory of the controller; and
locate the functions in the executable object via the identification of the executable object.

Aspect 4. The computational storage system according to any one of aspects 1-3, wherein when the controller is configured to convey the result object to the destination of the computational storage system, the controller is configured to store the result object in the storage subsystem, to convey the result object to the host, and/or to convey a value of the result object to the host.

Aspect 5. The computational storage system according to any one of aspects 1-4, further comprising a memory subsystem, wherein the memory subsystem is configured to:
receive a second work chunk from the host, the second work chunk including identification of a second executable object and identification of a second data object;
locate the second data object in the storage via the identification of the second data object;
obtain a copy of the second data object in a memory of the memory subsystem;
execute functions in the second executable object on the second data object in the memory of the memory subsystem to generate a second result object; and
convey the second result object to a second destination of the computational storage system.

Aspect 6. The computational storage system according to aspect 5, wherein when the memory subsystem is configured to convey the second result object to the second destination of the computational storage system, the memory subsystem is configured to store the second result object in the storage subsystem, to convey the second result object to the host, and/or to convey a value of the second result object to the host.

Aspect 7. The computational storage system according to any one of aspects 1-6, further comprising a memory subsystem, wherein the memory subsystem is configured to:
receive a third work chunk from the host, the third work chunk including identification of a third executable object and identification of a third data object;
locate the third data object in the storage via the identification of the third data object;
obtain a copy of the third data object in a memory of the memory subsystem; and
map the memory of the memory subsystem into an address space accessible to the host,
wherein the host is configured to execute functions in the third executable object on the third data object in the address space to generate a third result object,
wherein the memory subsystem is further configured to convey the third result object to a third destination of the computational storage system.

Aspect 8. The computational storage system according to aspect 7, wherein when the memory subsystem is configured to convey the third result object to the third destination of the computational storage system, the memory subsystem is configured to store the third result object in the storage subsystem, and/or to return control to the host.

Aspect 9. The computational storage system according to any one of aspects 1-8, further comprising a memory subsystem, wherein the memory subsystem is configured to:
obtain a copy of the result object in a memory of the memory subsystem;
execute functions on the result object in the memory of the memory subsystem to generate a fourth result object; and
convey the fourth result object to a fourth destination of the computational storage system.

Aspect 10. The computational storage system according to aspect 9, wherein when the memory subsystem is configured to convey the fourth result object to the fourth destination of the computational storage system, the memory subsystem is configured to store the fourth result object in the storage subsystem, to convey the fourth result object to the host, and/or to convey a value of the fourth result object to the host.

Aspect 11. A method for a computational storage system including a storage subsystem having a controller and a storage, the method comprising:
the controller receiving a work chunk from a host, the work chunk including identification of an executable object and identification of a data object;
the controller locating the data object in the storage via the identification of the data object;
the controller obtaining a copy of the data object in a memory of the controller;
the controller executing functions in the executable object on the data object in the memory of the controller to generate a result object; and
the controller conveying the result object to a destination of the computational storage system.

Aspect 12. The method according to aspect 11, further comprising:
the controller generating a polling thread in the memory of the controller to receive the work chunk from the host.

Aspect 13. The method according to aspect 11 or aspect 12, further comprising:
the controller obtaining a copy of the executable object in the memory of the controller; and
the controller locating the functions in the executable object via the identification of the executable object.

Aspect 14. The method according to any one of aspects 11-13, wherein the controller conveying the result object to the destination of the computational storage system includes storing the result object in the storage subsystem, conveying the result object to the host, and/or conveying a value of the result object to the host.

Aspect 15. The method according to any one of aspects 11-14, further comprising:
a memory subsystem receiving a second work chunk from the host, the second work chunk including identification of a second executable object and identification of a second data object;
the memory subsystem locating the second data object in the storage via the identification of the second data object;
the memory subsystem obtaining a copy of the second data object in a memory of the memory subsystem;
the memory subsystem executing functions in the second executable object on the second data object in the memory of the memory subsystem to generate a second result object; and
the memory subsystem conveying the second result object to a second destination of the computational storage system.

Aspect 16. The method according to aspect 15, wherein the memory subsystem conveying the second result object to the second destination of the computational storage system includes storing the second result object in the storage subsystem, conveying the second result object to the host, and/or conveying a value of the second result object to the host.

Aspect 17. The method according to any one of aspects 11-16, further comprising:
a memory subsystem receiving a third work chunk from the host, the third work chunk including identification of a third executable object and identification of a third data object;
the memory subsystem locating the third data object in the storage via the identification of the third data object;
the memory subsystem obtaining a copy of the third data object in a memory of the memory subsystem;
the memory subsystem mapping the memory of the memory subsystem into an address space accessible to the host;
the host executing functions in the third executable object on the third data object in the address space to generate a third result object; and
the memory subsystem conveying the third result object to a third destination of the computational storage system.

Aspect 18. The method according to aspect 17, wherein the memory subsystem conveying the third result object to the third destination of the computational storage system includes storing the third result object in the storage subsystem, and/or returning control to the host.

Aspect 19. The method according to any one of aspects 11-18, further comprising:
a memory subsystem obtaining a copy of the result object in a memory of the memory subsystem;
the memory subsystem executing functions on the result object in the memory of the memory subsystem to generate a fourth result object; and
the memory subsystem conveying the fourth result object to a fourth destination of the computational storage system.

Aspect 20. The method according to aspect 19, wherein the memory subsystem conveying the fourth result object to the fourth destination of the computational storage system includes storing the fourth result object in the storage subsystem, conveying the fourth result object to the host, and/or conveying a value of the fourth result object to the host.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A computational storage system comprising:
a storage subsystem having a controller and a storage, wherein the controller is configured to:
receive a work chunk from a host, the work chunk including identification of an executable object and identification of a data object;
locate the data object in the storage via the identification of the data object;
obtain a copy of the data object in a memory of the controller;
execute functions in the executable object on the data object in the memory of the controller to generate a result object; and
convey the result object to a destination of the computational storage system.

2. The computational storage system according to claim 1, wherein the controller is further configured to:
generate a polling thread in the memory of the controller to receive the work chunk from the host.

3. The computational storage system according to claim 1, wherein the controller is further configured to:
obtain a copy of the executable object in the memory of the controller; and
locate the functions in the executable object via the identification of the executable object.

4. The computational storage system according to claim 1, wherein when the controller is configured to convey the result object to the destination of the computational storage system, the controller is configured to store the result object in the storage subsystem, to convey the result object to the host, and/or to convey a value of the result object to the host.

5. The computational storage system according to claim 1, further comprising a memory subsystem, wherein the memory subsystem is configured to:
- receive a second work chunk from the host, the second work chunk including identification of a second executable object and identification of a second data object;
- locate the second data object in the storage via the identification of the second data object;
- obtain a copy of the second data object in a memory of the memory subsystem;
- execute functions in the second executable object on the second data object in the memory of the memory subsystem to generate a second result object; and
- convey the second result object to a second destination of the computational storage system.

6. The computational storage system according to claim 5, wherein when the memory subsystem is configured to convey the second result object to the second destination of the computational storage system, the memory subsystem is configured to store the second result object in the storage subsystem, to convey the second result object to the host, and/or to convey a value of the second result object to the host.

7. The computational storage system according to claim 1, further comprising a memory subsystem, wherein the memory subsystem is configured to:
- receive a third work chunk from the host, the third work chunk including identification of a third executable object and identification of a third data object;
- locate the third data object in the storage via the identification of the third data object;
- obtain a copy of the third data object in a memory of the memory subsystem; and
- map the memory of the memory subsystem into an address space accessible to the host,
- wherein the host is configured to execute functions in the third executable object on the third data object in the address space to generate a third result object,
- wherein the memory subsystem is further configured to convey the third result object to a third destination of the computational storage system.

8. The computational storage system according to claim 7, wherein when the memory subsystem is configured to convey the third result object to the third destination of the computational storage system, the memory subsystem is configured to store the third result object in the storage subsystem, and/or to return control to the host.

9. The computational storage system according to claim 1, further comprising a memory subsystem, wherein the memory subsystem is configured to:
- obtain a copy of the result object in a memory of the memory subsystem;
- execute functions on the result object in the memory of the memory subsystem to generate a fourth result object; and
- convey the fourth result object to a fourth destination of the computational storage system.

10. The computational storage system according to claim 9, wherein when the memory subsystem is configured to convey the fourth result object to the fourth destination of the computational storage system, the memory subsystem is configured to store the fourth result object in the storage subsystem, to convey the fourth result object to the host, and/or to convey a value of the fourth result object to the host.

11. A method for a computational storage system including a storage subsystem having a controller and a storage, the method comprising:
- the controller receiving a work chunk from a host, the work chunk including identification of an executable object and identification of a data object;
- the controller locating the data object in the storage via the identification of the data object;
- the controller obtaining a copy of the data object in a memory of the controller;
- the controller executing functions in the executable object on the data object in the memory of the controller to generate a result object; and
- the controller conveying the result object to a destination of the computational storage system.

12. The method according to claim 11, further comprising:
- the controller generating a polling thread in the memory of the controller to receive the work chunk from the host.

13. The method according to claim 11, further comprising:
- the controller obtaining a copy of the executable object in the memory of the controller; and
- the controller locating the functions in the executable object via the identification of the executable object.

14. The method according to claim 11, wherein the controller conveying the result object to the destination of the computational storage system includes storing the result object in the storage subsystem, conveying the result object to the host, and/or conveying a value of the result object to the host.

15. The method according to claim 11, further comprising:
- a memory subsystem receiving a second work chunk from the host, the second work chunk including identification of a second executable object and identification of a second data object;
- the memory subsystem locating the second data object in the storage via the identification of the second data object;
- the memory subsystem obtaining a copy of the second data object in a memory of the memory subsystem;
- the memory subsystem executing functions in the second executable object on the second data object in the memory of the memory subsystem to generate a second result object; and
- the memory subsystem conveying the second result object to a second destination of the computational storage system.

16. The method according to claim 15, wherein the memory subsystem conveying the second result object to the second destination of the computational storage system includes storing the second result object in the storage subsystem, conveying the second result object to the host, and/or conveying a value of the second result object to the host.

17. The method according to claim 11, further comprising:
- a memory subsystem receiving a third work chunk from the host, the third work chunk including identification of a third executable object and identification of a third data object;
- the memory subsystem locating the third data object in the storage via the identification of the third data object;
- the memory subsystem obtaining a copy of the third data object in a memory of the memory subsystem;

the memory subsystem mapping the memory of the memory subsystem into an address space accessible to the host;

the host executing functions in the third executable object on the third data object in the address space to generate a third result object; and the memory subsystem conveying the third result object to a third destination of the computational storage system.

18. The method according to claim 17, wherein the memory subsystem conveying the third result object to the third destination of the computational storage system includes storing the third result object in the storage subsystem, and/or returning control to the host.

19. The method according to claim 11, further comprising:

a memory subsystem obtaining a copy of the result object in a memory of the memory subsystem;

the memory subsystem executing functions on the result object in the memory of the memory subsystem to generate a fourth result object; and the memory subsystem conveying the fourth result object to a fourth destination of the computational storage system.

20. The method according to claim 19, wherein the memory subsystem conveying the fourth result object to the fourth destination of the computational storage system includes storing the fourth result object in the storage subsystem, conveying the fourth result object to the host, and/or conveying a value of the fourth result object to the host.

* * * * *